United States Patent
Song

(10) Patent No.: US 11,182,759 B2
(45) Date of Patent: Nov. 23, 2021

(54) SELF-SERVICE CHECKOUT COUNTER

(71) Applicant: Advanced New Technologies Co., Ltd., George Town (KY)

(72) Inventor: Yang Song, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/816,503

(22) Filed: Mar. 12, 2020

(65) Prior Publication Data
US 2020/0327521 A1 Oct. 15, 2020

Related U.S. Application Data

(63) Continuation of application No. PCT/CN2020/071402, filed on Jan. 10, 2020.

(30) Foreign Application Priority Data

Apr. 15, 2019 (CN) .......................... 201920505397.8

(51) Int. Cl.
*G06Q 20/18* (2012.01)
*F21V 21/10* (2006.01)
(Continued)

(52) U.S. Cl.
CPC ................ *G06Q 20/18* (2013.01); *F21V 3/00* (2013.01); *F21V 21/10* (2013.01); *G03B 15/05* (2013.01);
(Continued)

(58) Field of Classification Search
CPC ...... G06Q 20/18; G06Q 20/201; H04N 5/247; G07G 1/06; G07G 1/145; G06K 7/10;
(Continued)

(56) References Cited

U.S. PATENT DOCUMENTS 3,027,668 A * 4/1962 Hardesty ................. G09F 13/22
40/544
6,457,644 B1 10/2002 Collins, Jr. et al.
(Continued)

FOREIGN PATENT DOCUMENTS

CN 102799850 11/2012
CN 202904599 4/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Thai Q Tran
*Assistant Examiner* — Nienru Yang
(74) *Attorney, Agent, or Firm* — Fish & Richardson P.C.

(57) ABSTRACT

A self-service checkout counter is disclosed. In implementations of the present specification, the checkout counter includes a countertop for holding at least one product; a lighting panel disposed opposite to the countertop, wherein the lighting panel comprises at least one light source that provides lighting to items placed on the countertop; a pole that connects the countertop and the lighting panel, and supports the lighting panel; and a plurality of cameras that shoot images of items placed on the countertop, wherein the images are used to perform product identification and pricing and at least a part of the plurality of cameras are disposed on the lighting panel.

30 Claims, 9 Drawing Sheets

(51) Int. Cl.
  *G03B 15/05* (2021.01)
  *F21V 3/00* (2015.01)
  *G07G 1/06* (2006.01)
  *G06Q 20/20* (2012.01)
  *H04N 5/247* (2006.01)
  *G07G 1/14* (2006.01)
  *F21Y 105/16* (2016.01)
  *F21Y 115/10* (2016.01)

(52) U.S. Cl.
  CPC .............. *G06Q 20/201* (2013.01); *G07G 1/06* (2013.01); *G07G 1/145* (2013.01); *H04N 5/247* (2013.01); *F21Y 2105/16* (2016.08); *F21Y 2115/10* (2016.08); *G03B 2215/0567* (2013.01)

(58) Field of Classification Search
  CPC .......... G06K 9/00362; F21S 8/00; F21V 3/00; F21V 12/10; F21V 21/10; G03B 15/05; G03B 2215/0567; F21Y 2105/16; F21Y 2115/10
  USPC ........................................... 348/150; 362/145
  See application file for complete search history.

(56) References Cited

U.S. PATENT DOCUMENTS

| | | | | |
|---|---|---|---|---|
| 8,917,905 | B1* | 12/2014 | Dill .................... | G06K 9/00362 382/103 |
| 2013/0304595 | A1* | 11/2013 | Goncalves ........... | G07G 1/0063 705/22 |
| 2014/0177912 | A1 | 6/2014 | Okamura | |
| 2014/0263603 | A1 | 9/2014 | Jones et al. | |
| 2015/0103522 | A1* | 4/2015 | Liu .................... | G02B 19/0019 362/235 |
| 2017/0249491 | A1* | 8/2017 | MacIntosh ............ | G06Q 30/00 |
| 2020/0336656 | A1 | 10/2020 | Nyallau et al. | |

FOREIGN PATENT DOCUMENTS

| | | | | |
|---|---|---|---|---|
| CN | 103226687 | | 7/2013 | |
| CN | 105718833 | | 6/2016 | |
| CN | 205739268 | U * | 11/2016 | ............. B65G 43/08 |
| CN | 106326802 | | 1/2017 | |
| CN | 105242100 | A * | 3/2017 | ........... G01R 19/145 |
| CN | 106529365 | | 3/2017 | |
| CN | 106529365 | A * | 3/2017 | ............... G06K 7/10 |
| CN | 107578582 | | 1/2018 | |
| CN | 108062837 | | 5/2018 | |
| CN | 207529487 | | 6/2018 | |
| CN | 109190439 | | 1/2019 | |
| CN | 109389068 | | 2/2019 | |
| CN | 109522967 | | 3/2019 | |
| CN | 109558867 | | 4/2019 | |
| CN | 110264645 | | 9/2019 | |
| JP | 2014089669 | | 5/2014 | |
| KR | 20180077910 | | 7/2018 | |

OTHER PUBLICATIONS

Nakamoto, "Bitcoin: A Peer-to-Peer Electronic Cash System," www.bitcoin.org, 2005, 9 pages.
U.S. Appl. No. 16/810,670 filed Mar. 5, 2020, Song.
PCT International Search Report and Written Opinion in International Appln. No. PCT/CN2020/071402, dated Mar. 26, 2020, 17 pages (with partial English machine translation).
PCT International Search Report and Written Opinion in International Appln. No. PCT/CN2020/072059, dated Apr. 17, 2020, 19 pages (with partial English machine translation).

\* cited by examiner

SELF-SERVICE CHECKOUT COUNTER

CROSS-REFERENCE TO RELATED APPLICATIONS

This application is a continuation of PCT Application No. PCT/CN2020/071402, filed on Jan. 10, 2020, which claims priority to Chinese Patent Application No. 201920505397.8, filed on Apr. 15, 2019, and each application is hereby incorporated by reference in its entirety.

TECHNICAL FIELD

The present specification relates to the technical field of a checkout counter, and in particular, to a self-service checkout counter.

BACKGROUND

The development of technologies has contributed to the reform of the retail sector. In the new retail sector, self-service checkout counters are used to improve checkout countering efficiency and reduce labor costs. A solution for performing product identification based on machine vision has become one of mainstream solutions in the industry because of its cost and precision. However, visual product identification is performed based on the physical appearance of a product based on a machine vision algorithm. The physical appearance of the product is affected by intensity of external light (for example, strong light or insufficient light), or a color of external light (light of different colors), or blocking between products. Those factors can affect imaging quality, thereby reducing identification accuracy or causing an identification error. It is necessary to eliminate the impact of the above factors.

SUMMARY

Implementations of the present specification provide a self-service checkout counter. The checkout counter includes a countertop, configured to carry at least one product; a lighting panel disposed opposite to the countertop, where the lighting panel includes at least one light source, and the at least one light source provides lighting for the at least one product carried on the countertop; a pole, connected to the countertop and the lighting panel and configured to support the lighting panel; and multiple cameras, configured to shoot images of the at least one product, where the images are used to perform product identification and pricing; and at least a part of the multiple cameras is disposed on the lighting panel.

In some implementations, the lighting panel includes a light shielding plate, the light shielding plate is made of an opaque material or a translucent material and configured to shield light from above, and the at least one light source is disposed on a side of the light shielding plate that is facing the countertop.

In some implementations, the lighting panel includes an upper surface and a lower surface, the lower surface faces the countertop and is made of a transparent material; the upper surface deviates from the countertop and is made of an opaque material or a translucent material; the at least one light source is disposed between the upper surface and the lower surface, and irradiates the countertop through the lower surface.

In some implementations, the at least one light source is an area light source substantially the same size as the lighting panel.

In some implementations, the at least one light source includes multiple point light sources, and the multiple point light sources are dispersedly disposed in the lighting panel.

Further, in some implementations, the multiple point light sources include multiple LED lights controlled by an LED controller.

In some implementations, the pole is a hollow pole accommodating a connection line that provides power and/or control for the light source and/or the cameras.

In some implementations, a display device is installed on the pole to display a pricing result for the at least one product.

In some implementations, the multiple cameras include a first camera, and the first camera is disposed on the pole.

In some implementations, the lighting panel is a rectangular panel, and the multiple cameras include cameras disposed at four corners of the rectangular panel.

In some implementations, the multiple cameras face at least one of a top direction, a front direction, a left direction, a right direction, and a rear direction of the product.

In some implementations, the multiple cameras include a second camera, and an angle between a direction of the second camera and a vertical direction of the countertop is between 30 degrees and 60 degrees.

In some implementations, the checkout counter further includes a processing device, and the processing device is connected to the multiple cameras to obtain images shot by the cameras.

In some implementations, the processing device includes a communications unit, configured to send the images to a server and receive a category or a price of each product in the at least one product.

Therefore, in the implementations of the present specification, an opaque or translucent lighting panel is disposed on the self-service checkout counter to shield uncontrollable light on the ceiling and provide stable and controllable lighting, thereby improving photographing quality, avoiding shadows, etc. In addition, two or more cameras are deployed on the lighting panel. In a case that products are blocked from each other, image collection quality can be effectively improved.

DESCRIPTION OF IMPLEMENTATIONS

To make the technical solutions and advantages of the implementations of the present utility model clearer, the following further describes the technical solutions of the present utility model in detail by using the accompanying drawings and implementations.

In the description of the present application, the terms "center", "above", "below", "front", "back", "left", "right", "vertical", "horizontal", "top", "bottom", "inside", "outside" indicate orientations or positional relationships based on the accompanying drawings, are merely for ease of description and simplification of the present application, and are not intended to indicate or imply that the referred apparatus or component must have a specific orientation, or must be constructed or operated at a specific orientation. Therefore, this is not understood as a limitation on the present application.

Figure 1:
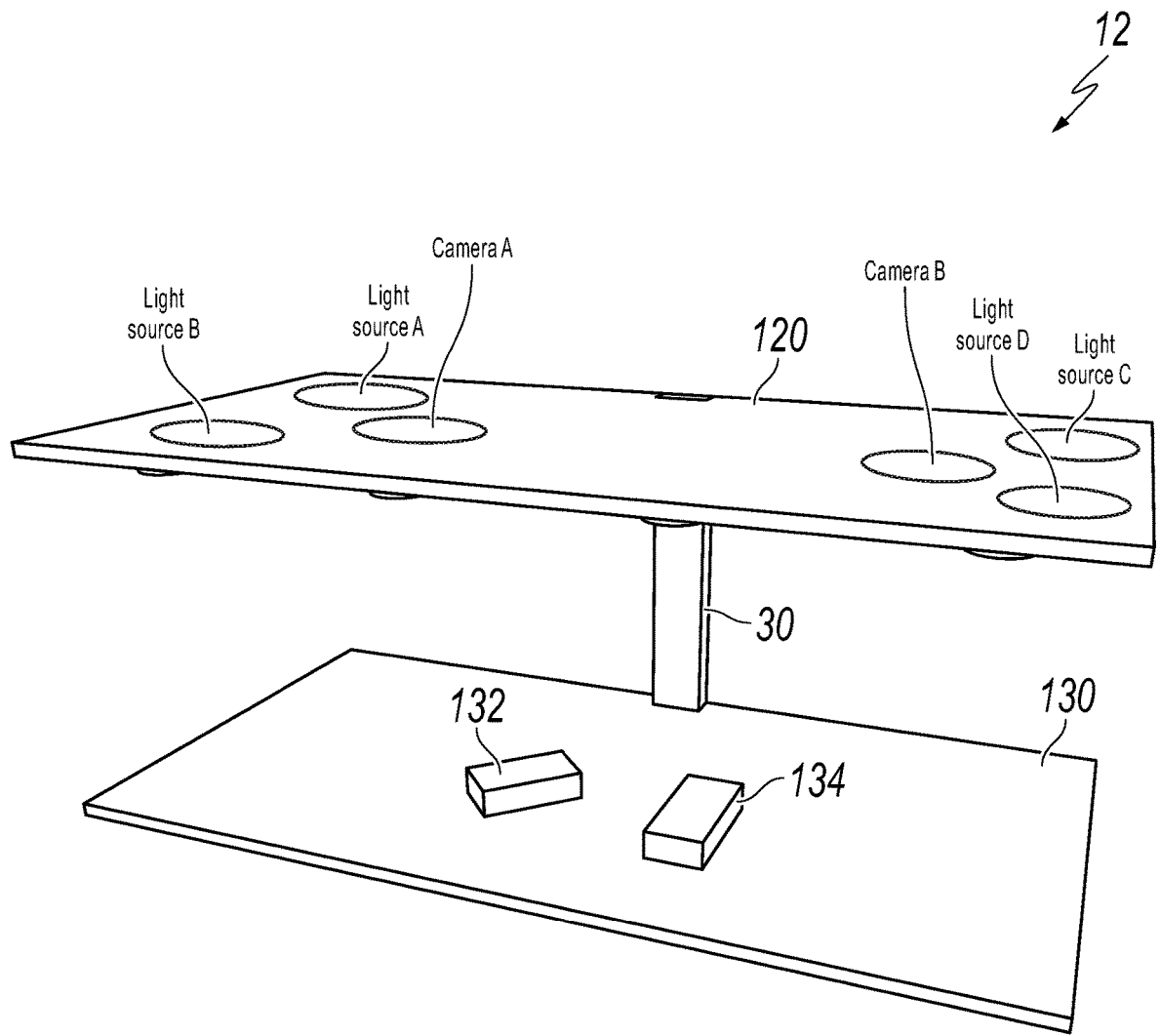
FIG. 1 is a schematic structural diagram illustrating a self-service checkout counter, according to some implementations of the present specification.

FIG. 1 is a schematic structural diagram illustrating a self-service checkout counter, according to some implementations of the present specification. As shown in FIG. 1, a self-service checkout counter 12 includes a countertop 130 and a lighting panel 120 that are disposed opposite to each other. One or more poles 30 can be used to connect the countertop 130 to the lighting panel 120, and used to support the lighting panel 120. A line can be disposed in the pole to provide power or control for an electronic or electrical device embedded or disposed in the lighting panel 120. The countertop 130 is located below and is configured to carry one or more products 132 and 134. The lighting panel 120 is located above and is configured to block external light from the above of the checkout counter and provide an ideal lighting environment for the products on the countertop, so the light for the products is stable, facilitating the detection of the products or the operation of the identification algorithm.

Specifically, the lighting panel 120 can include at least one light source. In the example of FIG. 1, the at least one light source is exemplified as a light source A, a light source B, a light source C, and a light source D.

Multiple cameras can be disposed on the self-service checkout counter, and are configured to shoot images of the products 132 and 134, and the shot images are used to perform product identification and pricing. In the example of FIG. 1, the multiple cameras are shown as a camera A and a camera B that are disposed on the lighting panel 120.

The following describes various specific implementations of each part of the checkout counter.

The lighting panel 120 can have multiple shapes, such as a rectangle or an arc, and there are extended covers on both sides. Any panel shape can be accepted as long as the shape can shield or partially shield external light source from above. The size of the lighting panel 120 can be equal to or slightly larger or smaller than the size of the countertop.

Figure 2A:
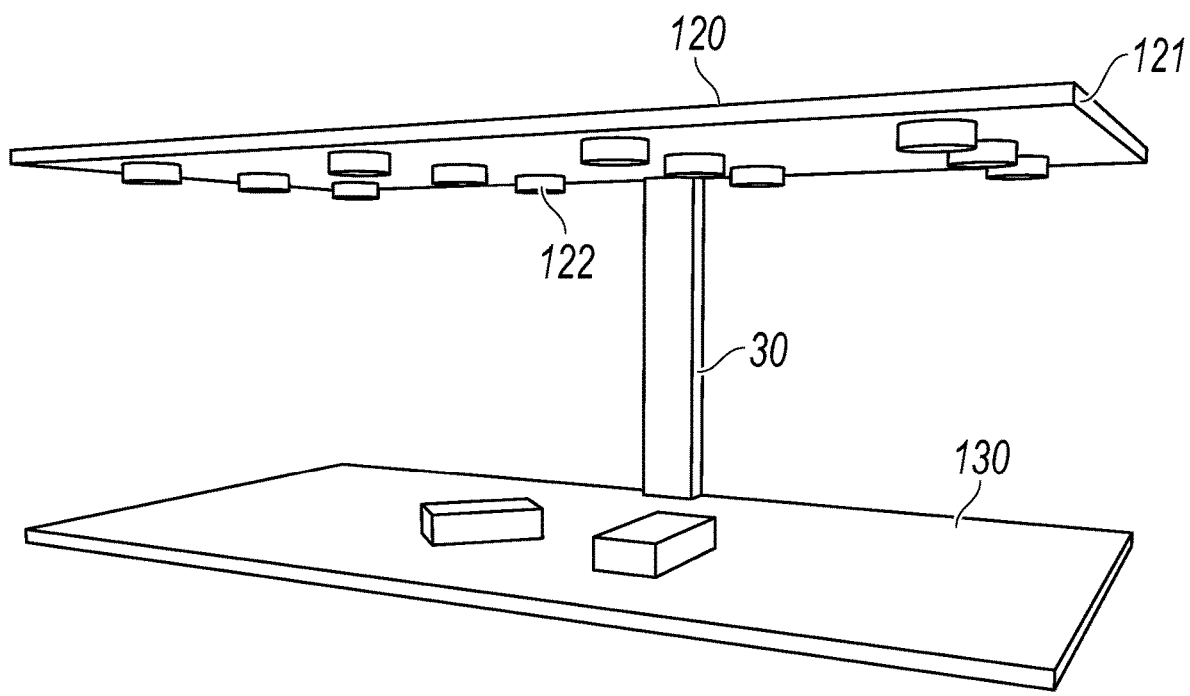
FIG. 2*a* is a schematic structural diagram illustrating a checkout counter in some implementations.

FIG. 2a is a schematic structural diagram illustrating a checkout counter in some implementations. In the example of FIG. 2a, the lighting panel 120 includes a light shielding plate 121, which is made of an opaque material or a translucent material and is configured to shield external light from above. The light source 122 is disposed on a side of the light shielding plate that is facing the countertop, so as to provide lighting for the countertop.

Figure 2B:
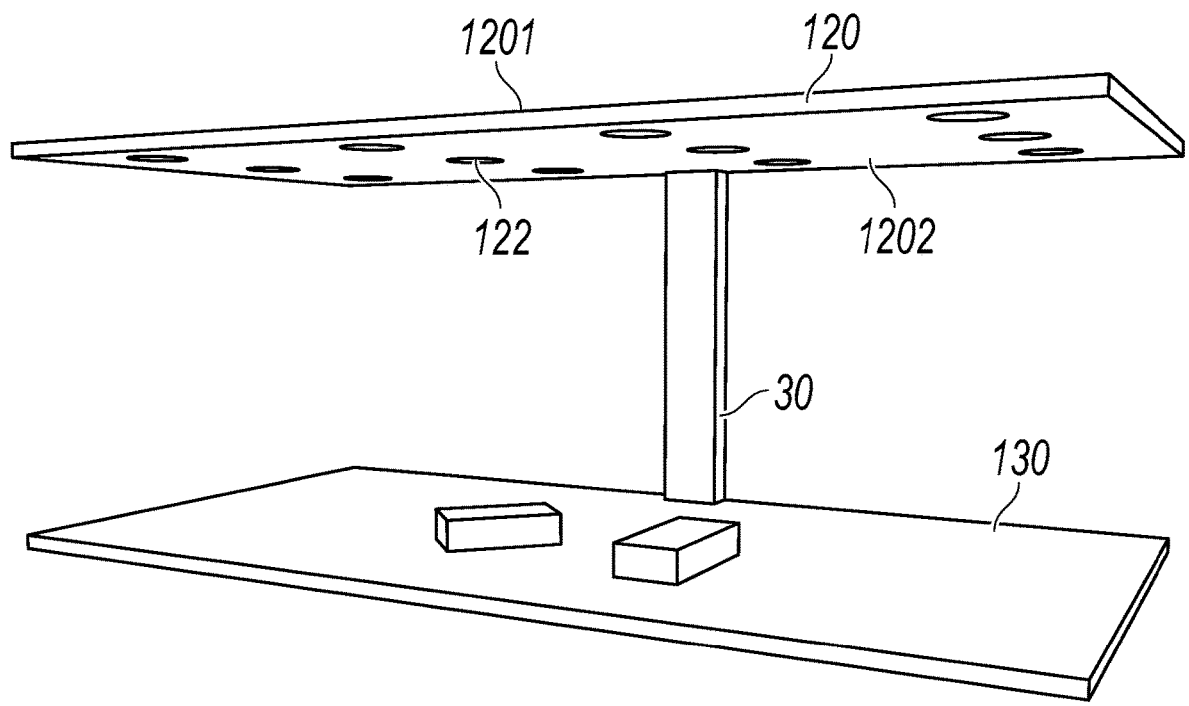
FIG. 2*b* is a schematic structural diagram illustrating a checkout counter in some other implementations.

FIG. 2b is a schematic structural diagram illustrating a checkout counter in some other implementations. In the example of FIG. 2b, the lighting panel 120 includes an upper surface 1201 and a lower surface 1202, and the lower surface 1202 faces the countertop or is closer to the countertop, and can be made of a transparent material. The upper surface 1201 is made of an opaque material or a translucent material and deviates from the countertop or is far away from the countertop. The light source 122 is disposed between the two surfaces, irradiates the countertop through the transparent lower surface, and shields the upper light through the opaque or translucent upper surface. In an example, the lower surface can be made of a material that has a diffuse reflection, such as a ground glass, so as to make light more uniform as light passes, which improves the lighting condition of the product.

The light source in the lighting panel 120 can be disposed in multiple ways. In some examples, the light source can use an area light source that has substantially the same size as the lighting panel. In some other examples, the light source can include a linear light source including multiple light emitting rods, for example. In yet some other examples, the light source can include multiple point light sources dispersedly distributed in the lighting panel.

Figure 3:
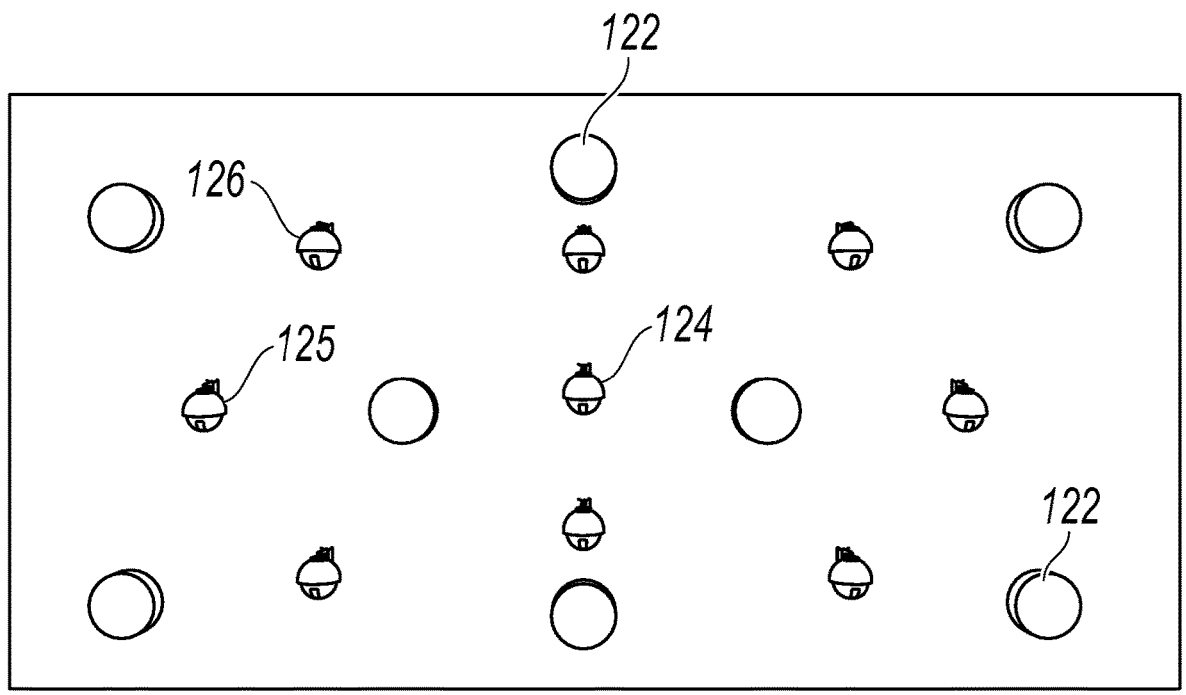
FIG. 3 is a bottom view of a lighting panel 120 seen from below.

FIG. 3 is a bottom view of a lighting panel 120 seen from below. In the example of FIG. 3, the lighting panel includes multiple light sources 122. These light sources 122 are dispersedly disposed in the lighting panel and can be specifically mounted on the lower surface facing the countertop, or disposed between the upper and lower surfaces. The light source can be an LED light or a light source in another form. In specific application scenarios, the number and disposing of the light sources 122 can have many options, and two light sources, four light sources, and even more light sources can be selected. A layout method can also be customized as required. The key to visual-based product identification is to obtain clear pictures, and stable and uniform lighting provides a good guarantee.

The light source can be in a form of a controllable light source, and brightness of the light source is adjusted with a working environment. For example, an LED controller can be used to control multiple LED lights.

In the example of FIG. 3, multiple cameras 124, 125, and 126 can be disposed on the self-service checkout counter, and these cameras can be disposed on the lighting panel 120. The cameras can be common RGB cameras, or can be 3D cameras. There can be two or more cameras. These cameras are disposed based on the field of view (FOV) of the cameras and the size of the product placement platform.

In different application scenarios, there can be more options of the number and disposing of cameras. Two cameras, three cameras, or more cameras are possible. A layout method can also be customized as needed. For example, in some examples, the lighting panel is a rectangular panel. Cameras can be disposed at four corners of the rectangular panel. Further, a camera can be disposed in the center of the rectangular panel. In some other examples, several cameras can be disposed along an outer edge of the lighting panel. For example, if the lighting panel is oval, several cameras can be disposed along the oval circumference at intervals.

It should be understood that the purpose of disposing multiple cameras is to shoot products placed on the countertop from different angles to obtain multi-angle images, thereby effectively avoiding blocking between products. Therefore, multiple cameras can be disposed to shoot at different angles. Here, an angle of the camera can be a direction of a center line of the FOV of the camera.

In an example, different cameras are disposed to obtain a video or an image of a product in at least one of a top direction, a front direction, a left direction, a right direction, or a rear direction of the product. To obtain an image in the front direction, the rear direction, the left direction, or the right direction, the camera can be mounted on another object other than the lighting panel. For example, in some implementations, the camera can further be disposed on the pole 30 supporting the lighting panel 120, so as to shoot in the front or rear direction of the product.

Figure 4:
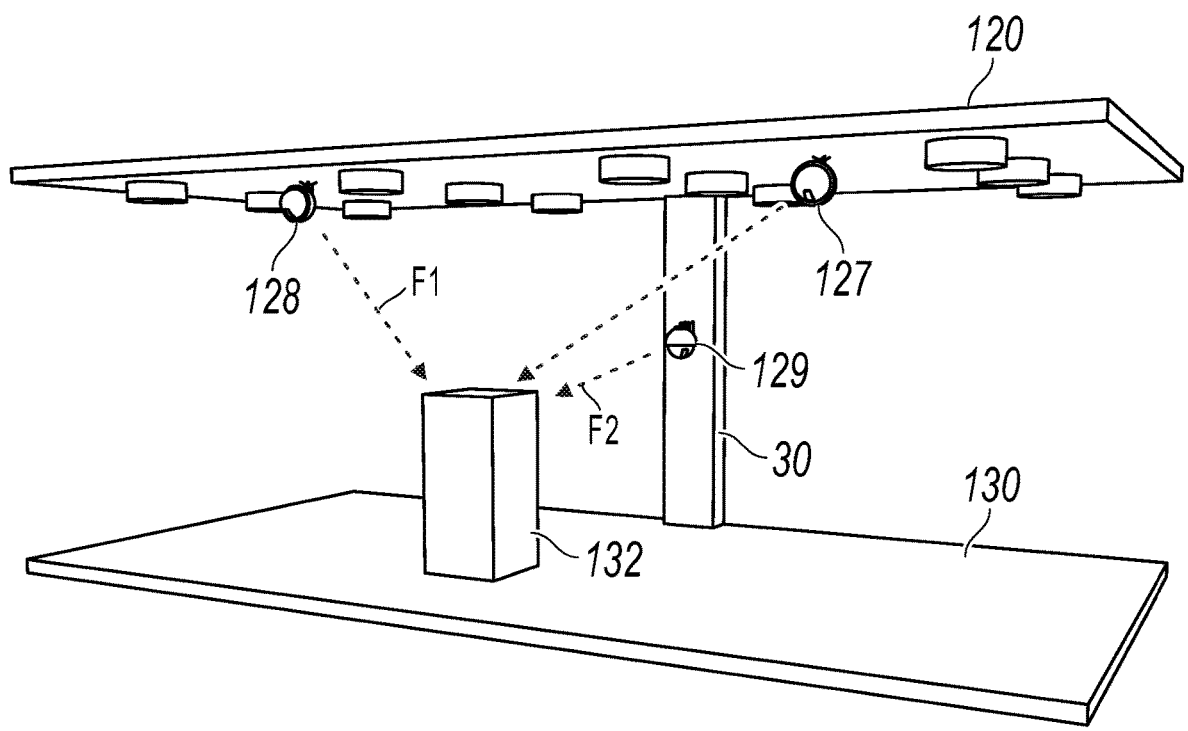
FIG. 4 is a schematic structural diagram illustrating a checkout counter in some implementations.

FIG. 4 is a schematic structural diagram illustrating a checkout counter in some implementations. In the example of FIG. 4, a camera 127 is disposed at the center of the lighting panel 120, and the camera can shoot the product 132 in the top direction. A camera 128 is disposed at the top corner of the lighting panel 120, and a direction of the camera is shown as arrow F1. The direction of F1 can be considered as an oblique direction of the product. The oblique direction can be considered as, for example, an angle between the oblique direction and the vertical direction of the countertop is between 30 and 60 degrees.

In addition, a camera 129 is further disposed on the pole 30, and a direction of the camera is shown as arrow F2. The direction of F2 can be considered as the front or rear direction of the product.

Certainly, more cameras can be disposed, so shooting can be performed from more angles.

In addition to supporting the lighting panel 120 and being used to install the cameras, the pole 30 can have more functions.

Figure 5:
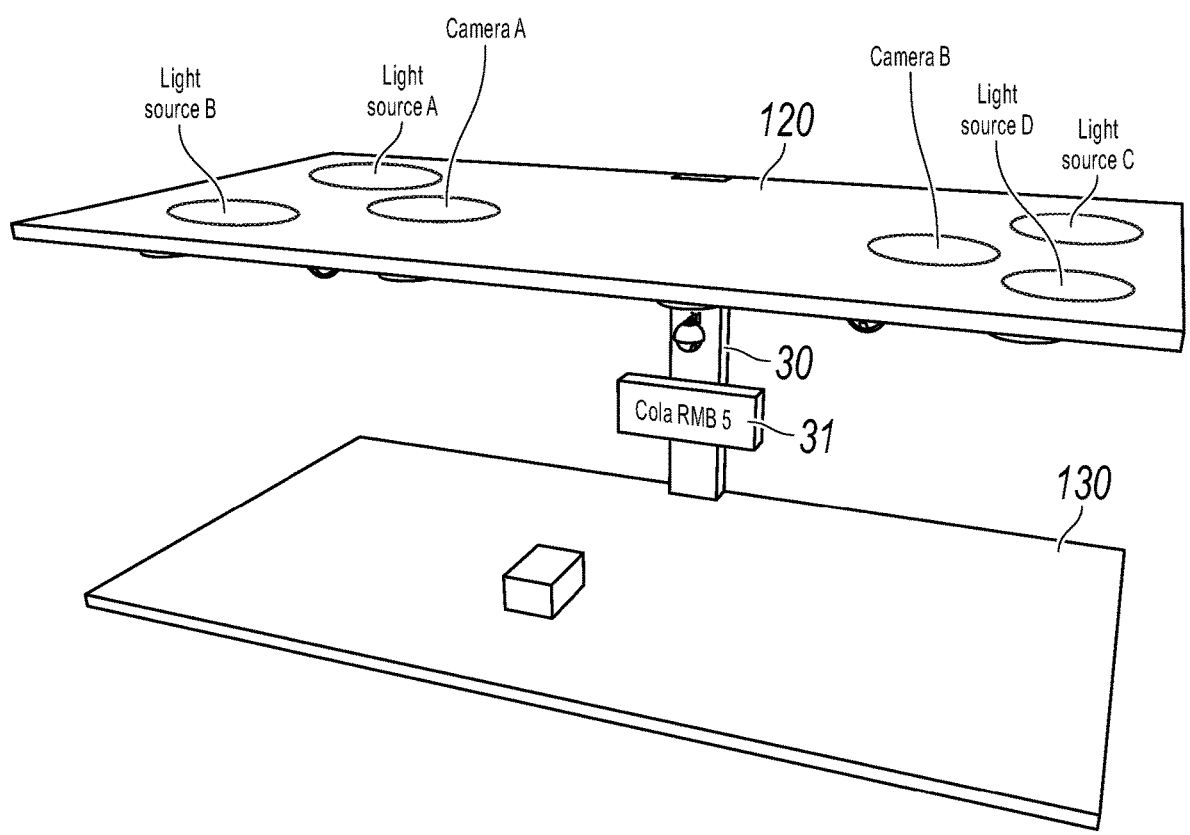
FIG. 5 is a schematic structural diagram illustrating a checkout counter, according to some implementations.

In some implementations, the pole 30 is a hollow pole, and the hollow portion can accommodate a connection line that provides power and/or control for the light source and/or the cameras. FIG. 5 is a schematic structural diagram illustrating a checkout counter, according to some implementations. In the example depicted in FIG. 5, a display device 31 is installed on the pole 30, and is configured to display a pricing result of the product.

To implement self-service checkout counter, the self-service checkout counter also needs to be equipped with a corresponding electronic device or pricing device, which is collectively referred to as a processing device. The processing device is configured to price each product based on a category or a price of the product that is determined based on images of the product.

In some examples, the processing device includes a communications unit. The communications unit sends the images to a server. The server performs various processing based on the images to determine a category or a price of each product. The processing device receives the category or price of each product from the server, and then prices the product on the checkout counter. In some examples, a sending function and a receiving function of the communications unit can be separated. The sending function can be associated with the cameras, and the receiving function can be combined with the processing device.

In some other examples, the processing device can process the collected images alone to obtain images of each product, and determine the category and/or the price of each product from the image parts.

Figure 6:
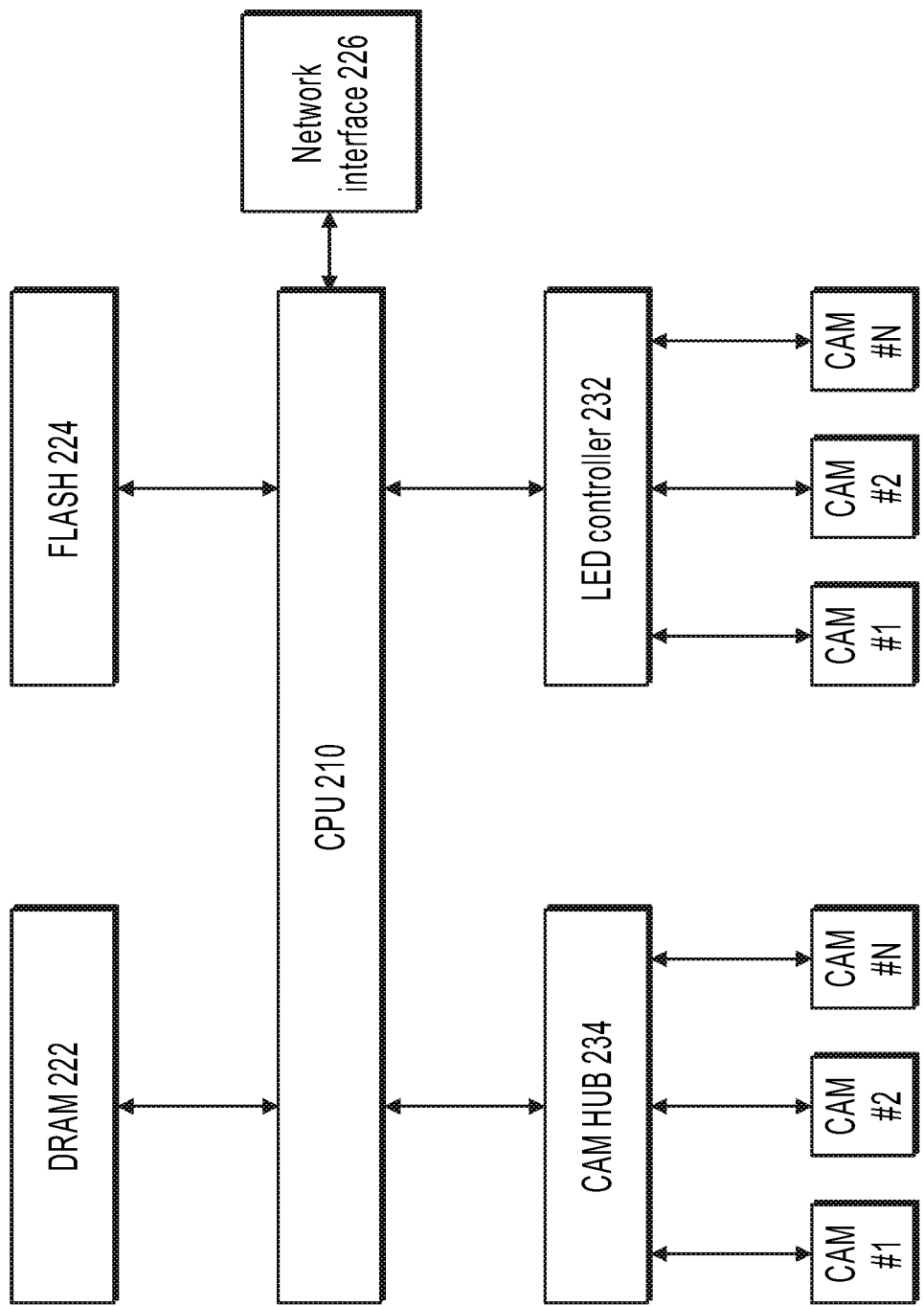
FIG. 6 is a schematic structural diagram illustrating a processing device of a self-service checkout counter, according to some implementations of the present specification.

FIG. 6 is a schematic structural diagram illustrating a processing device of a self-service checkout counter, according to some implementations of the present specification. The processing device of the self-service checkout counter can include multiple electronic components or apparatuses.

As shown in FIG. 6, a processor 210 controls overall operations of the processing device. An LED controller 232 can be configured to control multiple LED lights (LED #1, LED #2, LED #N) so the lights provide uniform and stable lighting. A CAM HUB 234 is a camera hub, and can be configured to control multiple previous cameras (CAM #1, CAM #2, CAM #N) to obtain images. Optionally, the device can further include a network/bus interface 226 coupled to a data link, and configured to perform data communication with the server. The network/bus interface 226 can further receive images from the cameras. In the case of a wireless connection, the network/bus interface 226 can include a wireless transceiver. The electronic device further includes a FLASH 224. In some examples, the FLASH 224 can store software, and the software is loaded into a DRAM 222 from the FLASH to control a CPU 210 to perform corresponding operations.

Figure 7:
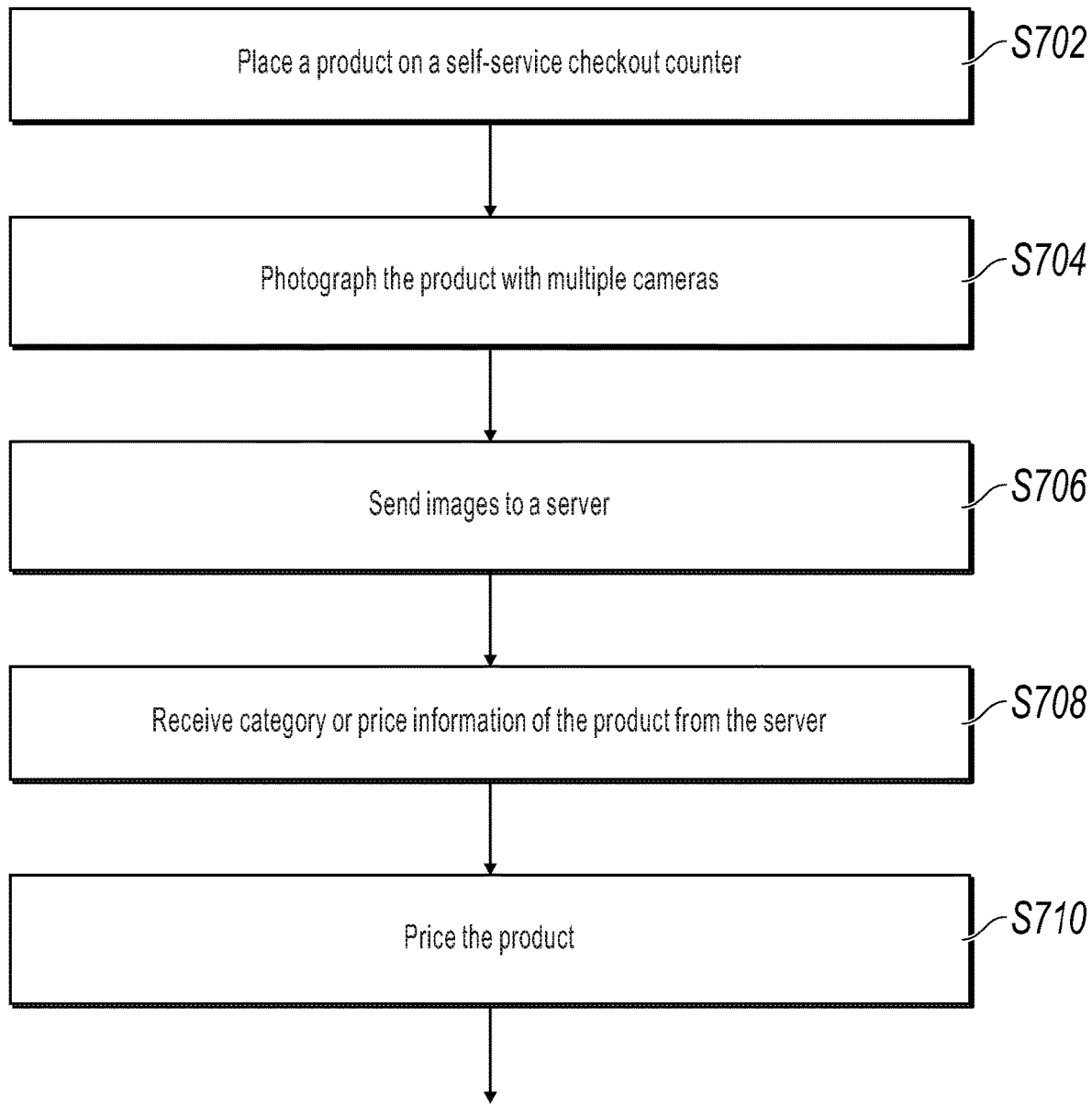
FIG. 7 is a schematic flowchart illustrating a self-service method performed at a self-service checkout counter, according to some implementations of the present specification.

FIG. 7 is a schematic flowchart illustrating a self-service method performing at a self-service checkout counter method, according to some implementations of the present specification. The process can be implemented by the processing device in FIG. 6. In step S702, a user places multiple products on a countertop of a checkout counter. In step S704, the products are photographed simultaneously by using multiple cameras, and the products are illuminated by using the previous lighting panel. In step S706, the images are sent to a server system. In step S708, category or price information of the multiple products is received from the server system. In step S710, the multiple products are priced based on the category or price information of the products.

Figure 8:
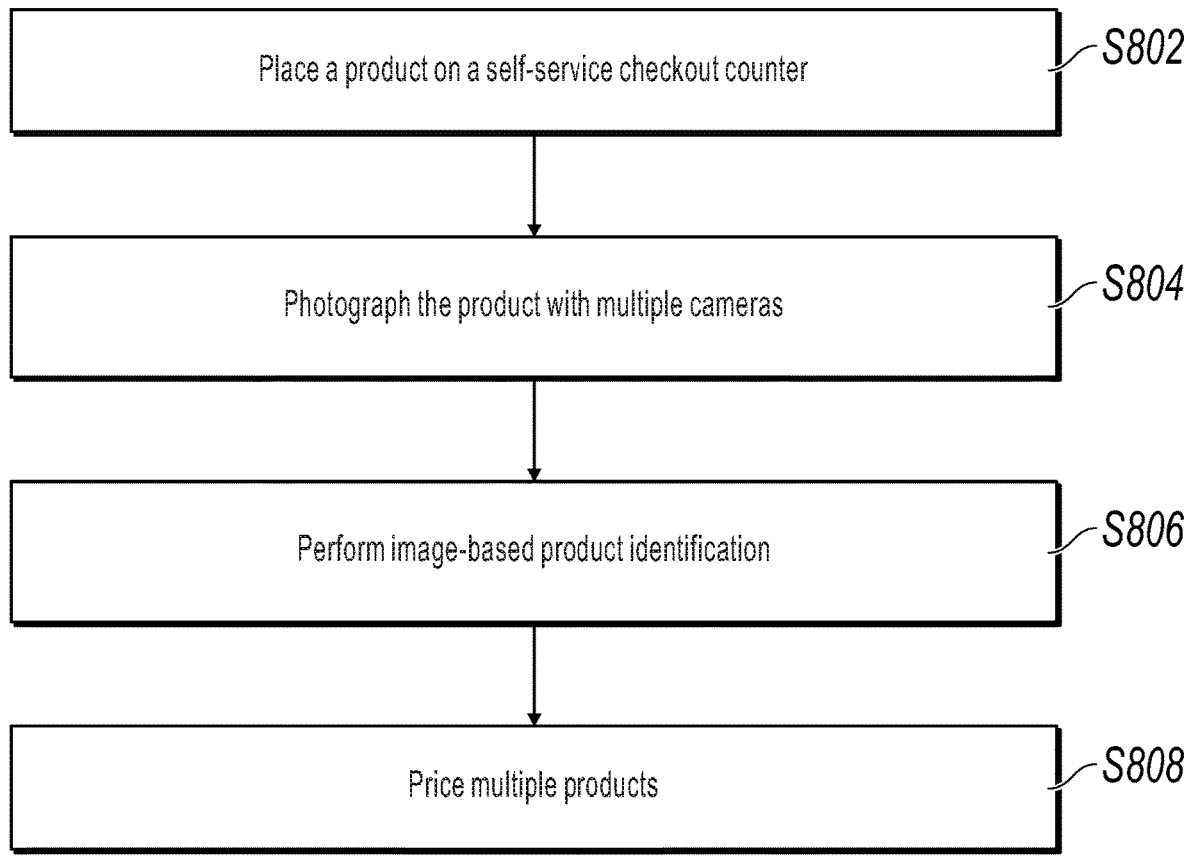
FIG. 8 is a schematic flowchart illustrating a self-service method performed at a self-service checkout counter, according to some other implementations of the present specification.

FIG. 8 is a schematic flowchart illustrating a self-service method performed at a checkout counter, according to some other implementations of the present specification. The process can be implemented by a processing device. This implementation is different from that of FIG. 7 in that steps S706 and S708 are replaced. In step S806 of FIG. 8, the processing device performs product identification on images obtained by cameras. The product identification can include barcode detection and/or visual identification, so as to identify a category of a product and further obtain a price of the product.

In the previous implementation processes, the lighting panel shields the outside uncontrollable light, and provides a controllable and stable lighting environment for the products on the countertop, which contributes to the image quality of the products. In addition, multiple cameras shoot photos from multiple angles, so as to obtain forms of the products from different angles, thereby avoiding blocking between the products. As such, high-quality and multi-angle product images can be obtained, which is helpful to improve the accuracy of product identification by the self-service checkout counter based on images and the efficiency of using the self-service checkout counter.

The technical solutions disclosed in the present specification are applicable to supermarkets and convenience stores. For example, a self-service checkout counter can be disposed on a fast passage, so users purchasing only a few products can use the self-service checkout counter to price the products. This not only satisfies the user's sense of participation, but also greatly shortens the time of using the checkout counter.

In the described implementations, the objective, technical solutions, and benefits of the present utility model are further described in detail. It should be understood that the descriptions are merely implementations of the present utility model, but are not intended to limit the protection scope of the present specification. Any modification, equivalent replacement, or improvement made without departing from the spirit and principle of the present utility model should fall within the protection scope of the present specification.

What is claimed is:

1. A self-service checkout counter comprising:
   a countertop for holding items to be purchased;
   a lighting panel disposed opposite and parallel to the countertop, wherein the lighting panel comprises a flat rectangular surface, a light shielding plate providing diffuse refraction of environmental light from above, and a plurality of light sources that are disposed on a side of the light shielding plate that faces the countertop and provide uniform and stable lighting to the items placed on the countertop, wherein an area of the lighting panel is sized substantially similar to a top surface of the countertop;
   a vertical pole that connects the countertop and the lighting panel, and supports the lighting panel; and
   a plurality of cameras configured to capture images of the items that are used to perform barcode detection, visual identification, category identification, and pricing of each of the items, wherein a portion of the plurality of cameras are symmetrically disposed at four corners of the flat rectangular surface on the lighting panel and one or more cameras of the plurality of cameras are disposed on the vertical pole, the plurality of cameras capturing the images of the items at a plurality of different angles that avoid image blocking between the items, and wherein at least a part of the plurality of cameras are disposed on the lighting panel.

2. The self-service checkout counter according to claim 1, wherein the light shielding plate is made of ground glass.

3. The self-service checkout counter according to claim 1, wherein the lighting panel comprises an upper surface and a lower surface, the lower surface faces the countertop and is made of a transparent material, the upper surface is further away from the countertop compared to the lower surface and is made of an opaque material or a translucent material, and the plurality of light sources are disposed between the upper surface and the lower surface, and illuminates the countertop through the lower surface.

4. The self-service checkout counter according to claim 1, wherein the plurality of light sources are an area light source with a size substantially similar to the lighting panel.

5. The self-service checkout counter according to claim 1, wherein the plurality of light sources comprise a plurality of point light sources dispersedly disposed on the lighting panel.

6. The self-service checkout counter according to claim 5, wherein the plurality of point light sources comprise a plurality of LED lights controlled by an LED controller.

7. The self-service checkout counter according to claim 1, wherein the vertical pole is hollow to accommodate one or more wires for transmitting electricity and control signals to the plurality of light sources and the plurality of cameras.

8. The self-service checkout counter according to claim 1, wherein a display device is installed on the vertical pole to display at least one price for the items.

9. The self-service checkout counter according to claim 1, wherein the plurality of cameras are symmetrically distributed relative to the plurality of light sources.

10. The self-service checkout counter according to claim 1, wherein the plurality of cameras comprise a central camera disposed at a center of the lighting panel.

11. The self-service checkout counter according to claim 1, wherein the plurality of cameras is configured to shoot one or more of a top view, a front view, a left view, a right view, and a rear view of the items.

12. The self-service checkout counter according to claim 1, wherein at least one of the plurality of cameras faces a direction that is between 30 degrees and 60 degrees with a vertical direction to the countertop.

13. The self-service checkout counter according to claim 1, further comprising a computing device communicably coupled to the plurality of cameras to receive the images.

14. The self-service checkout counter according to claim 13, wherein the computing device comprises a transceiver configured to send the images to a server and to receive price information of the items from the server.

15. A computer-implemented method performed by a self-service checkout counter, the computer-implemented method comprising:
   detecting items to be purchased placed on a countertop of a self-service checkout counter, wherein the items are illuminated by a lighting panel disposed opposite to the countertop, and wherein the countertop and the lighting panel are connected by a vertical pole, wherein the lighting panel comprises a flat rectangular surface and a light shielding plate providing diffuse refraction of environmental light from above and comprises a plurality of light sources disposed on a side of the light shielding plate that faces the countertop to provide uniform and stable lighting to the items placed on the countertop, wherein an area of the lighting panel is sized substantially similar to a top surface of the countertop;
   imaging the items by using a plurality of cameras to generate one or more images of the items, wherein the images are used to perform barcode detection, visual identification, category identification and pricing, and a portion of the plurality of cameras are symmetrically disposed at four corners of the flat rectangular surface on the lighting panel and one or more cameras of the plurality of cameras are disposed on the vertical pole, the plurality of cameras capturing the images of the items at a plurality of different angles that avoid image blocking between the items;
   sending the one or more images to a server; and
   receiving price information of the items from the server.

16. The computer-implemented method according to claim 15, wherein the light shielding plate is made of ground glass.

17. The computer-implemented method according to claim 16, wherein the lighting panel comprises an upper surface and a lower surface, the lower surface faces the countertop and is made of a transparent material, the upper surface is further away from the countertop compared to the lower surface and is made of an opaque material or a translucent material, and the plurality of light sources are disposed between the upper surface and the lower surface, and illuminates the countertop through the lower surface.

18. The computer-implemented method according to claim 15, wherein the self-service checkout counter comprises a computer device to receive the one or more images from the plurality of cameras and a transceiver to send the one or more images to the server.

19. The computer-implemented method according to claim 15, wherein a display device is installed on the vertical pole to display at least one price for the items.

20. The computer-implemented method according to claim 15, wherein the plurality of cameras comprise a central camera disposed at a center of the lighting panel.

21. The computer-implemented method according to claim 15, wherein the plurality of cameras is configured to shoot one or more of a top view, a front view, a left view, a right view, and a rear view of the items.

22. The computer-implemented method according to claim 15, wherein at least one of the plurality of cameras faces a direction that is between 30 degrees and 60 degrees with a vertical direction to the countertop.

23. A non-transitory, computer-readable medium storing one or more instructions executable by a computer-implemented system to perform operations for self-service checkout, the operations comprising:

detecting items to be purchased placed on a countertop of a self-service checkout counter, wherein the items are illuminated by a lighting panel disposed opposite to the countertop, and wherein the countertop and the lighting panel are connected by a vertical pole, wherein the lighting panel comprises a flat rectangular surface and a light shielding plate providing diffuse refraction of environmental light from above and comprises a plurality of light sources disposed on a side of the light shielding plate that faces the countertop to provide uniform and stable lighting to the items placed on the countertop, wherein an area of the lighting panel is sized substantially similar to a top surface of the countertop;

imaging the items by using a plurality of cameras to generate one or more images of the items, wherein the images are used to perform barcode detection, visual identification, category identification and pricing, and a portion of the plurality of cameras are symmetrically disposed at four corners of the flat rectangular surface on the lighting panel and one or more cameras of the plurality of cameras are disposed on the vertical pole, the plurality of cameras capturing the images of the items at a plurality of different angles that avoid image blocking between the items;

sending the one or more images to a server; and receiving price information of the items from the server.

24. The non-transitory, computer-readable medium according to claim 23, wherein the light shielding plate is made of ground glass.

25. The non-transitory, computer-readable medium according to claim 24, wherein the lighting panel comprises an upper surface and a lower surface, the lower surface faces the countertop and is made of a transparent material, the upper surface is further away from the countertop compared to the lower surface and is made of an opaque material or a translucent material, and the plurality of light sources are disposed between the upper surface and the lower surface, and illuminates the countertop through the lower surface.

26. The non-transitory, computer-readable medium according to claim 23, wherein the self-service checkout counter comprises a computer device to receive the one or more images from the plurality of cameras and a transceiver to send the one or more images to the server.

27. The non-transitory, computer-readable medium according to claim 23, wherein a display device is installed on the vertical pole to display at least one price for the items.

28. The non-transitory, computer-readable medium according to claim 23, wherein the plurality of cameras comprise a central camera disposed at a center of the lighting panel.

29. The non-transitory, computer-readable medium according to claim 23, wherein the plurality of cameras is configured to shoot one or more of a top view, a front view, a left view, a right view, and a rear view of the items.

30. The non-transitory, computer-readable medium according to claim 23, wherein at least one of the plurality of cameras faces a direction that is between 30 degrees and 60 degrees with a vertical direction to the countertop.

* * * * *